US005459209A

United States Patent [19]
Jablon

[11] Patent Number: 5,459,209
[45] Date of Patent: * Oct. 17, 1995

[54] COATING COMPOSITIONS CONTAINING OXIDIZED ETHYLENE-CARBON MONOXIDE COPOLYMERS AS RHEOLOGY MODIFIERS

[75] Inventor: Michael Jablon, Elizabeth, N.J.

[73] Assignee: AlliedSignal Inc., Morris Township, N.J.

[*] Notice: The portion of the term of this patent subsequent to Jul. 26, 2011 has been disclaimed.

[21] Appl. No.: 225,166

[22] Filed: Apr. 8, 1994

Related U.S. Application Data

[63] Continuation-in-part of Ser. No. 109,139, Aug. 19, 1993, Pat. No. 5,332,792.

[51] Int. Cl.$^6$ ............................................. C08F 283/00
[52] U.S. Cl. ...................... 525/539; 524/588; 524/590; 524/593; 524/597; 524/601; 524/612; 528/392
[58] Field of Search ................................. 524/588, 590, 524/593, 597, 601, 612; 525/539; 528/392

[56] References Cited

U.S. PATENT DOCUMENTS

| | | |
|---|---|---|
| 4,929,711 | 5/1990 | Chang et al. . |
| 4,957,997 | 9/1990 | Chang et al. . |
| 5,140,080 | 8/1992 | Chang . |
| 5,332,792 | 7/1994 | Jablon ................................... 525/539 |

OTHER PUBLICATIONS

Rheology Handbook, pp. 9–17 and 21–27.

Product Data Sheet on Dislon® 6900–20X (Jan. 1991).

Benjamin J. Dent et al., "The Effect of a Novel Class of Thixotropic Agents on the Rheological Properties of Low–VOC Coating", *American Paint & Coatings Journal*, 36 (Dec. 2, 1991).

*Primary Examiner*—John Kight, III
*Assistant Examiner*—Shelley A. Dodson
*Attorney, Agent, or Firm*—Roger H. Criss; Melanie L. Brown

[57] ABSTRACT

An improved coating composition having one or more polymeric binders dispersed in a liquid medium, wherein the improvement comprises an anti-sag and anti-settling effective amount of oxidized ethylene-carbon monoxide copolymer.

22 Claims, No Drawings

COATING COMPOSITIONS CONTAINING OXIDIZED ETHYLENE-CARBON MONOXIDE COPOLYMERS AS RHEOLOGY MODIFIERS

This application is a continuation-in-part application of Ser. No. 109,139 filed Aug. 19, 1993, U.S. Pat. No. 5,332,792.

The present invention relates to improved coating compositions. More particularly, the present invention relates to rheological additives for coating compositions. Even more particularly, the present invention relates to thixotropic additives which control sag, levelling, and pigment suspension in a coating composition. The rheological additives of the present invention are oxidized ethylene-carbon monoxide copolymers.

BACKGROUND OF THE INVENTION

In the formulation of coatings, it is well-known that rheological modifiers may be added to control the flow properties of the final product for a particular application. A large number of rheological additives are available to control properties of a coating formulation during storage, transportation, processing, application, and post-application to a particular surface. These additives include modified and unmodified organic clays, and a large variety of organic compounds and inorganic compounds such as silicas, as set forth, for example, in *Rheology Handbook*, Rheox, Inc., Hightstown, N.J. (1991).

The control of sag, levelling, and pigment suspension in a coating formulation requires additives which maintain the proper viscosity of the coating at a variety of shear rates. This is difficult, since control of these properties involves opposing phenomena. For example, total freedom from sag requires a coating with extremely high viscosities just after application; however, the low flow rate of such a material means that the coating may not flow out completely to form a smooth film. The development of an enveloping rheological structure to control pigment suspension during storage may result in coating which exhibits levelling problems during application.

To maintain viscosity under these diverse conditions, the prior art has suggested incorporation of additives, such as surfactants and thickeners, to control pigment suspension along with additional additives, such as organic clays, intended to control levelling and sag. However, production of a coating with such multiple additives is a difficult and complex procedure and sometimes requires separate processing conditions for incorporation of each rheological additive. A correct balance of properties must also be achieved among the various additives. In the prior art, even processing parameters of single rheological additives have proven quite difficult to control. If these precise formulation requirements are not employed, coatings with inconsistent properties may be produced. These precise formulations are also difficult to manufacture on a large scale, and require inventorying of a large variety of additive products.

SUMMARY OF THE INVENTION

The rheological modifier utilized in the improved coating composition of the present invention advantageously performs the functions of both an anti-sag additive and an anti-settling additive. In addition, the process of producing the coating composition of the present invention does not require the multiple formulation steps or precise parameter control necessary to compound the coatings of the prior art.

The present invention is an improved coating composition. In addition to the polymeric binder and liquid medium characteristic of typical coatings, the present composition includes an anti-sag and anti-settling effective amount of a thixotropic rheological modifier. The rheological modifier of the present invention comprises oxidized ethylene-carbon monoxide copolymers. The rheological modifier utilized in the present composition improves both the anti-sag and anti-settling characteristics of the coating composition.

Thus, the present invention provides a coating composition comprising: (a) at least one polymeric binder selected from the group consisting of drying oils, alkyds, allylics, amino resins, epoxies, acrylics, phenolics, silicones, polyurethanes, coumarone indene resins, polyamides, polycarbonates, polymers derived from the polymerization of $\alpha,\beta$-unsaturated monomers, vinyl polymers and copolymers, cellulosic polymers, and rubbers; (b) liquid medium; and (c) an anti-sag and anti-settling effective amount of an oxidized ethylene-carbon monoxide copolymer.

The present invention further includes a process for producing the improved coating composition above, which comprises the steps of:

(1) dispersing the rheological modifier of the present invention in a liquid medium to form a gel; and (2) incorporating the gel into a coating composition.

The rheological additive of the present invention may be incorporated into a paint composition in the pigment grinding step. The preparation of a coating composition containing the present additive requires fewer precise process steps than preparation of coatings with other known rheological modifiers, so that production on a commercial scale is simplified. The present process provides an anti-sag and anti-settling effective composition whose performance is less affected by processing parameters such as heat, shear, and air entrapment, than other known additives. In addition, the chemical structure of the rheological additive utilized in the present invention evolves fewer harmful by-products during processing than known additives, and provides a coating additive which releases fewer deleterious solvents during drying.

DETAILED DESCRIPTION OF THE INVENTION

The rheological modifiers utilized in the improved coatings of the present invention produce coatings which can generally be described as thixotropic in nature. When the modifiers of the present invention are incorporated into a coating, a wide range of coating viscosities may be produced, depending on shear rate.

In the improved coatings of the present invention, when shear forces are applied to the coating in the unsheared state, as shear rate is increased, viscosity decreases. The longer the material is sheared, the lower the viscosity, until some limiting value is reached. If the shear rate is then decreased, viscosity rebuilds slowly. This increase in viscosity is time dependent; and, given sufficient time (seconds to many hours), the viscosity returns to the value originally observed in the original unsheared state.

While not wishing to be bound by any theory, it is believed that intermolecular attractions between highly polar carboxyl functionalities as well as the esters, aldehydes, ketones, hydroxides, and peroxides formed in the oxidation process of the rheological additive of the present invention create a complex colloidal network in the unsheared state during storage. As the shear rate increases, the weak intermolecular attractions in the colloidal structure break down, and the coating exhibits excellent high-shear viscosity properties necessary for effective processing and application. As the rate of shear is decreased, the intermolecular structure again begins to rebuild and predominate. At low post-application shear rates, the intermolecular attractions again predominate to provide a coating viscosity which is high enough to prevent sag during the drying of the coating, but low enough to provide excellent levelling and film-forming properties. At the extremely low shear rates experienced during storage, the intermolecular attractions form a colloidal network which acts to reduce flocculation of any dispersed pigments present in the composition. As understood, this colloidal network envelops the pigment particles and reduces the interaction of electrostatic charges on the surface of the particles and thereby reduces settling.

The rheological additive of the present invention improves the sag resistance of a coating composition. Following application on a surface, the coating must maintain sufficient viscosity during the drying process to prevent unsightly runs and drips until the coating is dry. The rheological additive of the present invention was determined to increase the sag resistance of a coating composition, compared to a control composition without the rheological additive and compared to a composition having a known rheological additive.

The rheological additive of the present invention is also useful as an anti-settling additive for preventing excessive flocculation during storage. In practice, few pigments are dispersed to their ultimate particle size, and paints usually contain many aggregates and flocculants; however, the additive of the present invention maintains pigment dispersion levels at an adequate level for extended periods. Following extended storage of a pigmented composition containing the rheological additive of the present invention, an improvement in settling occurred, compared to a control composition without the rheological additive and compared to a composition having a known rheological additive.

The rheological modifier in the improved coating composition of the present invention comprises oxidized ethylene-carbon monoxide copolymers. Any oxidized ethylene-carbon monoxide copolymer which functions both as an anti-sag additive and an anti-settling additive is useful in the present invention. Preferably, the present oxidized ethylene-carbon monoxide copolymers have an acid number as determined by standardized titration of KOH of between about 4 and about 100 and a Brookfield viscosity at a temperature of 140° C. of between about 50 and about 800 centipoises. More preferably, the present oxidized ethylene-carbon monoxide copolymers have an acid number as determined by standardized titration of KOH of between about 4 and about 60 and a Brookfield viscosity at a temperature of 140° C. of between about 50 and about 800 centipoises. The ethylene-carbon monoxide copolymers are oxidized to an acid number as determined by a standardized titration of KOH of even more preferably between about 8 and about 30, and most preferably between about 10 and about 25. The present oxidized ethylene-carbon monoxide copolymers exhibit a Brookfield viscosity at a temperature of 140° C. of even more preferably in the range of between about 50 and about 700 centipoises and most preferably in the range of between about 100 and about 600 centipoises.

The present oxidized ethylene-carbon monoxide copolymers have a hardness as determined by ASTM D-5 of preferably about 1 to about 15 dmm, more preferably about 1 to about 10 dmm, and most preferably about 4 to about 8 dmm. The present oxidized ethylene-carbon monoxide copolymers have a Mettler Drop Point as determined by ASTM D-3104 of preferably about 95° C. to about 105° C., more preferably about 97° C. to about 104° C., and most preferably about 98° C. to about 104° C.

Preferably, before oxidation, the ethylene-carbon monoxide copolymers are from about 2 to about 30 weight percent carbon monoxide and about 70 to about 98 weight percent ethylene based on the total weight of the ethylene-carbon monoxide copolymer. More preferably, the ethylene-carbon monoxide copolymers are from about 2 to about 20 weight percent carbon monoxide and about 80 to about 98 weight percent ethylene based on the total weight of the ethylene-carbon monoxide copolymer. Most preferably, the ethylene-carbon monoxide copolymers are from about 3 to about 15 weight percent carbon monoxide and about 85 to about 97 weight percent ethylene based on the total weight of the ethylene-carbon monoxide copolymer.

The number average molecular weight of the oxidized ethylene-carbon monoxide copolymers is preferably from about 500 to about 10,000, more preferably from about 1,000 to about 8,000, and most preferably from about 1,500 to about 5,000, as measured by a vapor pressure osmometer.

Suitable oxidized ethylene-carbon monoxide copolymers will be available from AlliedSignal Inc., Morristown, N.J., United States of America. The most preferred oxidized ethylene-carbon monoxide copolymers have the properties listed in the following Table:

| | |
|---|---|
| Acid Number (mg KOH/g) | 16–18 |
| Brookfield Viscosity at 140° C. (centipoises) | 150–300 |
| Molecular Weight | 2,500–4,500 |
| Hardness (ASTM D-5) (dmm) | 4–8 |
| Mettler Drop Point (ASTM D-3104) (°C.) | 98–104 | and are made from ethylene-carbon monoxide copolymer having about 3 weight percent carbon monoxide and about 97 weight percent ethylene based on the total weight of the ethylene-carbon monoxide copolymers. Useful oxidized ethylene-carbon monoxide copolymer may also be prepared by any known method such as polymerizing ethylene with carbon monoxide and then oxidizing the polymerized product. As those skilled in the art known, the oxidation results in the scission of the polymer and the formation of acid groups. In addition to the formation of acid groups on the polymer chain, esters, aldehydes, ketones, hydroxides, and peroxides are also found in various quantities along the polymer chains.

As for other essential ingredients, the coating composition of this invention comprises a suitable binder or a film former and a liquid medium. Any conventional binder and liquid medium may be used, provided that they provide the coating system with desirable coating properties.

A wide range of conventional binders may be used in the present invention. Illustrative of useful binders are those which contain drying oils which react on curing to form a solid polymer. Drying oils include unsaturated compounds such as linseed oil, safflower oil, soya oil, tall oil, fish oil, oiticica oil, tung oil, and dehydrated castor oil, which usually contain fairly large percentages of unsaturated acids such as oleic, linoleic, linolenic, and eleostearic acids. These unsaturated oils react with atmospheric oxygen in the presence of metallic salts to form solid polymer.

Illustrative of other useful binders are thermoset polymers and thermoplastic polymers. Thermoset polymers for use as binders in the practice of this invention may vary widely. Illustrative of such useful thermoset polymers are oil-free alkyds derived from the esterification of a polybasic acid such as phthalic acid and a polyhydric alcohol such as glycol; allylics such as those produced by polymerization of dialkyl phthalate, dialkyl isophthalate, dialkyl maleate, and dialkyl chlorendate; cross-linked with amino resins such as those produced by addition reaction between formaldehyde and such compounds as urea, aniline, ethylene urea, sulfonamide and dicyandiamide; epoxies such as epoxy phenol novolak resins, diglycidyl ethers of bisphenol A and F and cycloaliphatic epoxies; phenolics such as resins derived from reaction of substituted and unsubstituted phenols such as cresol and phenol with an aldehyde such as formaldehyde and acetaldehyde; polyesters; silicones; and urethanes formed by reaction of a polyisocyanate such as 2,6-toluene diisocyanate, 2,4-toluene diisocyanate, 4,4-diphenylmethane diisocyanate, 1,6-hexamethylene diisocyanate and 4,4'-dicyclohexylmethane diisocyanate with a polyol such as polyether polyol (trimethylol propane, 1,2,6-hexanetriol, 2-methyl glycoside, pentaerythritol, poly(1,4-tetramethylene ether) glycol, sorbitol and sucrose), polyester polyols such as those prepared by esterification of adipic acid, phthalic acid and like carboxylic acids with an excess of difunctional alcohols such as ethylene glycol, diethylene glycol, propanediols, and butanediols.

Preferred thermosetting resin binders are alkyds, epoxies, unsaturated polyesters, thermosetting acrylics, phenolics, polyurethanes, and coumarone indene. Preferred alkyds are polyester resins made from polybasic acids and polyhydric alcohols. Glycerol and pentaerythritol may be used for the polycarboxylic acids. All of the oils described above can be used in alkyds by converting the fatty acid oils to monoglycerides and then reacting with a dibasic acid such as phthalic anhydride.

Alkyd resins vary greatly in their properties because many different oils, alcohols, and acids may be used to make them. In general, alkyds have faster drying, better gloss retention, and better color than oils. Most unmodified alkyds have low chemical and alkali resistance. Alkyds can be modified with rosin esterified in place of some oil acids. Phenolic resins, such as o- or p-phenylphenol, can also be used in order to produce greater hardness and better chemical resistance. Styrene and vinyl toluene may also be used to modify alkyds for faster dry, better hardness, and toughness. Silicones may be added to alkyds to provide paints having good adhesion, hardness, flexibility, toughness, exterior durability, and resistance to solvents, acids, and alkalis. Acrylic monomers may be copolymerized with oils to modify alkyd resins for fast dry, good initial gloss, adhesion, and exterior durability. Aromatic acids, e.g., benzoic or butylbenzoic, may be used to replace part of the fatty acids for faster air dry, high gloss, hardness, chemical resistance, and adhesion.

Preferred epoxy resins are prepared from epichlorohydrin and a dihydroxy compound, usually a bisphenol. Two reactions are involved in the polymerization: condensation to eliminate HCl and addition reactions to open epoxide rings along the chain to produce hydroxyl groups. The polymer has epoxide rings at each end and hydroxyl groups along the chain, which ensure good adhesion to polar surfaces such as metals. Two types of epoxy resins, catalyzed types and epoxy esters, exist.

Catalyzed epoxies must be converted to useful products by reaction with curing agents, e.g., amines, polyamide resins, ketamine, polysulfide resins, anhydrides, metallic hydroxides, or Lewis acids. Most of these materials are supplied as two-package systems to separate the materials until just before application. Polymer curing takes place by reaction of a curing agent with epoxide rings to cross-link the polymer. Paints made from these polymers have excellent chemical resistance and hardness and are often used for maintenance coatings, trade sales specialties, and industrial finishes. Chalking with exterior exposure, poor impact resistance, and the two-package system limit the use of epoxy finishes. The epoxy resin may also be reacted with drying oils or fatty acids to produce epoxy esters, which cure by air drying or heat. Paints made with epoxy esters do not have as good chemical and solvent resistance as catalyzed epoxies, but they are superior to oils and alkyds in this respect. They also exhibit chalking on exterior exposure.

Preferred thermosetting acrylic resins have at least one monomer belonging to the acrylic family which will react with itself or other resins at elevated temperatures to cross-link in order to cure. In addition to the acrylic monomers previously listed, acrylonitrile, acrylamide, styrene, and vinyl toluene are often used in these polymers. Thermosetting acrylic paints, which are hard and stain-resistant and have high gloss, are often used for appliance finishes.

Tough flexible finishes can be formulated for coil coatings. Preferred polyesters are unsaturated thermosetting polyester resins similar to those used for reinforced plastic. Although alkyds can be considered unsaturated polyesters, this term has been reserved for resins which have unsaturated compounds in the backbone of the polymer. These resins are made by reacting unsaturated dibasic acids, e.g. maleic anhydride, citraconic anhydride, fumaric acid, itaconic acid, phthalic anhydride, and adipic acid, with polyhydric alcohols, e.g., propylene glycol. Styrene or some other aromatic vinyl monomer is added to the polyester resin, which is then solubilized and made into a paint. Inhibitors, e.g., hydroquinone, may be added to prevent premature polymerization in the can; a catalyst must be added to initiate polymerization of the styrene monomer and the polyester resin for curing, which is often carded out at elevated temperatures. Polyester finishes are very hard, tough, resistant to solvents, and fairly heat-resistant. Silicones may be added to modify polyester for better exterior durability.

Preferred phenolic resins as used in coatings are primarily made from phenol and para-substituted phenols reacted with formaldehyde to form methylol groups on the phenol ring. Condensation polymers are often produced by reacting these groups with phenol. Phenolic coatings have fast dry, high build, and good resistance to moisture and chemicals. Their poor initial color and tendency to yellow after application limit their use. Phenolic coatings may be used for baked can coatings, and oil-modified phenolaldehyde finishes may be used for marine finishes and aluminum paints.

Polyurethanes are based upon reactions of isocyanates, RNCO where R is an organic radical. Urethane coatings have excellent solvent and chemical resistance, abrasion resistance, hardness, flexibility, gloss, and electrical properties. They are, however, rather expensive, and the aromatic isocyanates yellow after application. Polyisocyanates such as toluene diisocyanate react with hydroxylated drying oils to produce resins analogous to alkyds and epoxy esters. Finishes made with these urethane oils air-dry by oxidation of the unsaturated oils. Polyhydroxy materials can be reacted with isocyanates with an excess of the isocyanate so that the polymer will contain NCO groups, which react with moisture in the air after the coating is applied to crosslink the polymer for curing. Moisture-cured urethanes are difficult to pigment since the pigments must be completely dry and non-alkaline. They are used primarily for clear coatings.

Phenols will react with an isocyanate to block the isocyanate or prevent it from reacting with hydroxylated materials in the system. When this type of coating is heated to 150° C. after application, the phenol volatilizes from the film, leaving the isocyanate free to react with the hydroxyl-bearing resin to cure the film. Where a catalyst is employed, two-package systems are also used where a catalyst, e.g., a tertiary amine, is added to cross-link the polymer.

Coumarone-indene resins which are derived from coal tar are used widely to make aluminum paints since they aid leafing of the aluminum and minimize gas formation. They have a yellow color, however, and only fair durability except in aluminum paints.

Urea-formaldehyde, melamine-formaldehyde, hexamethoxymethylmelamine, benzoguanamine, and other triazine-formaldehyde resins are all hard, glossy, colorless, brittle, and chemically resistant thermosetting polymers used to modify basic coating vehicles, such as alkyds, thermosetting acrylics, and vinyls. Rosin may be used in making vehicles, such as maleic rosin alkyds, for use in consumer products or industrial finishes. Silicones may be used to modify alkyds and polyesters for better exterior durability.

Illustrative of still other polymers which are useful as binders are thermoplastic resins, such as polyesters, polyamides, polycarbonates, polymers derived from the polymerization of $\alpha,\beta$-unsaturated monomers and the like. Preferred thermoplastic binders are vinyl polymers and copolymers such as vinyl chloride/vinyl acetate copolymers and the like; cellulosic polymers such as nitrocellulose, ethyl cellulose, ethyl hydroxyethyl cellulose, cellulose acetate, hydroxy ethyl cellulose and the like; rubbers such as styrene-butadiene copolymer, chlorinated natural rubbers, and the like; and acrylic polymers or copolymers such as those derived from methyl methacrylate, butyl methyacrylate, methyl acrylates, butyl acrylate, ethyl acrylate, 2-ethylhexyl acrylate and the like.

The industry is heading toward higher solids binder. The amount of binder present varies depending upon the particular application. Typically, the amount of binder present is from about 25 to about 55 weight percent based on the total weight of the binder, liquid dispersion medium, pigment, and oxidized ethylene-carbon monoxide copolymer.

The liquid dispersion medium used in the practice of this invention may vary widely, and any such medium used in conventional coating compositions may be used. Such media and the particular binders with which they are used are well known in the art and will not be described in detail. Illustrative of such dispersion media are water and organic liquids such as hydrocarbons. Coatings are often classified on the basis of the dispersion medium; those which utilize water as the primary dispersion medium of the composition are distinguished from those which utilize organic liquids. Many of the same polymeric binders can be used in both types of compositions.

The industry is heading toward lower solvent systems. The amount of solvent present varies depending upon the particular application. Typically, the amount of liquid dispersion medium present is from about 15 to about 30 weight percent based on the total weight of the binder, the liquid dispersion medium, pigment, and the oxidized ethylene-carbon monoxide copolymer.

Water based paints are primarily latex paints, where the polymer particles are a discontinuous phase and water is the continuous phase. In latex paints, the latex binder consists of very small particles of liquid to semisolid polymer separated by water, which is the continuous phase. When the water evaporates, the polymer particles touch each other and fuse together, or coalesce, into a continuous paint film on drying. When used, pigment particles are also dispersed in the water phase, and the dry paint film consists of a mixture of pigment and polymer particles fused together. If the latex particles are so hard that they will not fuse together when the water evaporates, plasticizers are preferably added, e.g. carbitol acetate or dibutyl phthalate.

The amount of pigment present varies depending upon the particular application. Typically, the amount of pigment present is from about 20 to about 50 weight percent based on the total weight of the binder, liquid dispersion medium, pigment, and oxidized ethylene-carbon monoxide copolymer.

Rutile titanium dioxide is the primary pigment used in paints to obtain opacity, or hiding, in white or pastel paints. Semi-chalking grades are used for interior paints, chalk-resistant grades for exterior paints, and fine-particle-size grades for semigloss paints. Zinc oxide is sometimes used for exterior paints to help prevent mildew, but care must be taken in using this pigment because of its chemical reactivity.

A number of pigments, such as calcined clay and delaminated clay, can be used to advantage in paints as titanium dioxide extenders to increase opacity. These pigments have large surfaces areas due to irregular surfaces or fine particle size, and the vehicle will not cover all the pigment surface when the paint film is dry, leaving entrapped air in the film. The interfaces of air with pigment and vehicle increase the light scattering within the film and thus the opacity.

Many common extenders, e.g., mica, calcium carbonate, clay, talc, silica, and wollastonite, are used in coatings. Since these pigments vary in particle size, shape, hardness, color, surface treatment, and water demand, they can affect viscosity, flow, gloss, color, cleanability, scrubbability, enamel holdout, uniformity of appearance, and even opacity to some extent. Extender pigments are selected to obtain the desired properties for each type of paint. Slightly soluble ammonium phosphate compounds are used as the primary pigment in intumescent fire-retardant paints.

Surfactants are used in paints to help wet and disperse pigments, emulsify liquids, and function as defoamers. These materials have a balanced polar-nonpolar structure, which in water-base paints is usually referred to as a hydrophile-lipophile balance. The chemical composition of surfactants can vary greatly, and they are usually only classified into anionic, cationic, and nonionic types. Anionic surfactants (arylalkylsulfonates, sulfosuccinic acid esters, soaps, water-soluble amines, and sulfonated oils) and nonionic surfactants (partial esters of polyhydric alcohols with long-chain carboxylic acids, long-chain alcohols with free hydroxyl groups, and ethers of poly-hydric alcohols with long-chain fatty alcohols) are used primarily in latex paints.

The more hydrophilic water-soluble surfactants are used to wet and disperse pigments. Surfactants with a lipophilic chain to dissolve in a non-polar liquid and a hydrophilic group to dissolve in water are used to emulsify varnishes or oils in latex paints. Surfactants which are not water-soluble are used as defoamers.

Thickeners or protective colloids are used in latex paints to produce the desired viscosity and help stabilize emulsions and pigment dispersions. Water-soluble protein or casein dispersions and cellulosic polymers (carboxymethyl, hydroxyethyl, and methyl cellulose) are the most commonly used. Soluble polyacrylates, starches, natural gums, and inorganic colloidal materials have also been used.

Protective colloids may affect many properties of a paint, such as washability, brushability, rheological properties, and color acceptance. Since latex paints are susceptible to bacterial attack, they should contain preservatives. Several different preservative types may be used: phenolic, mercuric, arsenic, or copper compounds, formaldehyde, and certain quaternary chlorinated compounds. Some of these compounds are chemically active, and some are toxic, facts which must be considered in selecting a preservative. The main types of latex polymers used in latex paints are styrene-butadiene, vinyl homo- or copolymers, and acrylic polymers or copolymers.

In the preferred embodiments of the invention, the dispersion medium is an organic liquid, because unmodified thermosetting polymeric is binders such as alkyds may be solubilized in such liquids. However in other embodiments, many of the synthetic polymers now used in solvent or latex paints may be solubilized in water. Carboxylic, hydroxyl, epoxy, or amine groups on a polymer in conjunction with coupling solvents, such as alcohols, alcohol ethers, or glycol ethers, are the primary mechanisms by which resins are solubilized. Maleic or fumaric acids may be reacted with drying oils to produce resins with some carboxyl groups which may be solubilized in water with ammonia or amines. Alkyds may be solubilized in water by leaving a reactive carboxylic group on the resin instead of terminating the reaction with a monobasic acid or drying-oil acid. Dimethylol propionic acid, $CH_3C(CH_2OH)_2COOH$, and thrombolytic anhydride have been used for this reaction. A styrene-alkyl alcohol copolymer esterified by a fatty acid and reacted with maleic anhydride to provide solubility may be used as a water-soluble paint vehicle. Amine-solubilized water soluble polyesters, acrylics, epoxy esters, and phenolics may also be prepared. Water-soluble resins are usually solubilized by volatile alkalis, such as amines, to prevent the paint resin from remaining water-soluble after application.

As a preferred optional ingredient, the coatings of this invention include a colorant or pigment. Such materials are well known in the art and will not be described in any great detail. Illustrative of useful pigments are metal oxides, such as titanium dioxide, zinc oxide, lead oxide, iron oxide and the like; and metal sulfides such as zinc sulfide, cadmium sulfide and the like. A large number of organic pigments are also available for use in coating compositions.

In addition to the pigment, binder, and liquid, a coating composition also may contain many optional additives, such as defoamers, extenders, thickeners, flow agents, drying agents catalysts, preservatives, wetting agents, barrier enhancers such as clay and mica, surfactants, viscosity modifiers, and plasticizers to improve various properties. These optional additives are well known in the art and will not be described herein in any great detail. The selection of the pigments, binder, and additives depends, of course, upon the properties desired in the coating to be made.

The rheological additive of the present invention improves the sag resistance of a coating composition. Following application on a surface, the coating must maintain sufficient viscosity during the drying process to prevent unsightly rims and drips until the finish is dry. This problem is particularly acute with baking systems, in which the coating is dried rapidly at high temperatures. For the purposes of the present invention, the sag resistance is measured by a drawdown technique (ASTM D-4400 Method A), wherein varying thicknesses of the coating are drawn down on a drawdown card, such as the Leneta 7B, which has been retained on a vacuum plate. The drawdown card is then positioned vertically, and the coatings are allowed to dry. The drying may be conducted at room temperature, or an elevated temperature, such as in an oven. When drying is complete, the coatings are inspected, and the sag resistance value of the coating is determined by noting the coating thickness wherein runs or drips first appear. The rheological additive of the present invention was determined to increase the sag resistance of the composition, compared to a control composition without the rheological additive and compared to a composition having a known rheological additive.

The rheological additive of the present invention is also useful as an anti-settling additive for preventing excessive flocculation during storage. In practice, few pigments are dispersed to their ultimate particle size, and paints usually contain many aggregates and flocculants; however, the additive of the present invention maintains pigment dispersion levels at an adequate level for extended periods. In the present invention, coating compositions containing the rheological additive were stored in standard one pint paint cans at room temperature for extended periods, and the settling of the composition was measured according to ASTM D-869 and D-1849. Following extended storage of a pigmented composition containing the rheological additive of the present invention, an improvement in settling occurred, compared to a control composition without the rheological additive and compared to a composition having a known rheological additive.

The amount of rheological additive included in the coating composition may vary widely, and any amount which improves the anti-sag and anti-settling properties to any extent may be used. Generally, the mount of rheological additive incorporated into the present coating composition should be sufficient to increase the sag resistance of the composition and to improve the settling resistance of the composition, compared to a control composition without the rheological additive and compared to a composition having a known rheological additive. The amount of rheological additive employed in the present composition is preferably at least about 0.5% by weight, more preferably at least about 0.5 to about 2% by weight, and most preferably at least about 0.5 to about 1% by weight, based on the total weight of the coating composition.

Following addition of an effective amount of the rheological modifier of the present invention, the low shear viscosity ranges from about 1000 centipoises to about 10000 centipoises, as measured by a Brookfield Synchro-Lectric RVF viscometer (ASTM D-2196, Method A); or, about 125 Krebs Units (KU), as measured on a Stormer Viscometer (ASTM D-562). As used herein, the term "low shear" means a shear rate applied to the composition at about 0.1 $sec^{-1}$ to about 50 $sec^{-1}$ (storage and post application shear rates). Following addition of the present additive, the high shear viscosity of the composition ranges from about 5 poises to about 30 poises, as measured by an ICI Cone and Plate viscometer (ASTM D-4287). As used herein, the term "high shear" means a shear rate applied to the composition at about 3000 $sec^{-1}$ to about 12,000 $sec^{-1}$ (application shear rates).

The coating composition of this invention may be conveniently manufactured using conventional procedures well-known to those of skill in the art. Illustrative of such procedures are those described in detail in U.S. Pat. Nos. 2,923,438; 3,601,589; 3,916,168; and 4,403,866; and British Pat. No. 1,589,705.

In a preferred embodiment, it is necessary to make a pre-dispersion or polymer which consists of the rheological modifier dispersed in a liquid medium or in a resin. While the liquid medium utilized to prepare the concentrate may vary widely, the preferred liquids are xylene and mineral spirits. The most preferred liquid for the concentrate is xylene.

Generally, the concentrate is preferably prepared by dispersing fine particles of the oxidized ethylene-carbon monoxide copolymer in a liquid medium under heating and agitation. Any combination of heating, cooling, and agitation rates which provides a concentrate which is an opaque, gel-like dispersion of fine particles of the oxidized ethylene-carbon monoxide copolymer may be used.

In a preferred embodiment, following the heating step, under continuous agitation the solution is allowed to cool to determine the cloud point region, which is the temperature where the oxidized ethylene-carbon monoxide copolymer precipitates out of solution. The cloud point may be determined by the initial opacity of the blend. The mixture is then reheated until clarified, and allowed to cool; but, beginning at 5° C. above the cloud point, until 10° C. below the cloud point, the mixture is rapidly cooled to produce an opaque gel dispersion of fine particles.

In the most preferred embodiment of the present invention, the viscosity of the concentrate is adjusted such that the concentrate is pourable at room temperature. This ensures that subsequent incorporation of the concentrate into a coating composition will be a simple, single-step process.

The concentrate is then added to the paint formulation. The loading of the copolymer may be varied widely depending on the intended application; but, generally a loading of at least about 0.5% by weight is used, based on the total formula weight of the composition. A loading of about 0.5 to about 2% by weight of the oxidized ethylene-carbon monoxide copolymer is preferred, and a loading of about 0.5 to about 1% by weight is most preferred. For example, if the oxidized ethylene carbon monoxide copolymer is to be added at a 1% loading based on total formula weight of the coating composition, and the rheological modifier is prepared in a 20% solids dispersion form, 5% on total formula weight of dispersion is added.

Following addition of the dispersion, the grind paste is placed under sufficient shear to disperse any added pigments. As the pigments are dispersed, it is preferable that sufficient kinetic energy be input to raise the temperature of the grind base to at least about 140° F. (60° C.). This temperature is normally achieved in the pigment dispersion process, and, typically, no additional heating of the grind base is required.

To replace liquid volatilized during processing, additional liquid may be added to adjust the weight per gallon (ASTM D-1475) of the coating composition. Any suitable liquid medium may be utilized in this procedure, and normally the same liquid medium is utilized as in the coating composition. For example, in the present invention, xylene is preferably used as the liquid medium for the additive dispersion, and mineral spirits is preferably used as the liquid medium for the coating composition.

The particle size of the rheological modifier incorporated into the concentrate is important, and the size should be such that the polymer can be dispersed in the concentrate or subsequent coating composition to the desired extent. Whether by grinding, milling, shearing, or dispersing, the particle size of the rheological additive should preferably be less than about Hegman 6, as measured according to ASTM D-1210. A primary concern in the manufacture of coatings is the dispersion of pigments in the liquid portion. The coating compositions of this invention may optionally contain pigments to act as colorants, extenders, diffusion barriers and the like. Pigments used in coating compositions contain aggregates of fine particles, which are held together by strong forces of attraction. The use of a particular coating composition determines the extent to which the pigment particle size must be reduced. In order to reduce pigment aggregates in particle size, work in the form of high shear or attrition is applied to the pigment liquid slurry. Considerable work may also be required to wet the surface of the pigment and to displace any air or moisture that may be absorbed on the surface by the liquid. Wetting agents such as soaps or detergents in the dispersion phase of paints are often used to help wet and disperse pigments.

Since some pigments are harder to disperse than others, different types of dispersing equipment or mills are used. Dispersing pigments in a liquid is often called grinding although very little reduction in size of the original pigment particles occurs during the dispersion operation of paint manufacture.

The high-speed stone mill consists of a stationary carborundum stone and high-speed rotating stone. Pigment pastes are passed between these stones; the distance between the stones may be varied for more or less shearing action. These mills are suitable for high production rates of paints fairly easy to disperse, e.g., architectural paints, where very fine dispersion is not required.

Roller mills consist of steel rollers rotating in opposite directions at different speeds. The pigment-liquid paste is passed between the rolls, which can be adjusted to different clearances. Three-roll mills are the most widely used in the paint industry. Roller mills have relatively slow production rates and require skilled operators, but are capable of producing fine dispersions.

Heavy-duty dough mixers, consisting of two roughly S-shaped blades which overlap and rotate in opposite directions, are sometimes used to disperse very heavy pastes.

Ball and pebble mills consist of large cylindrical steel tanks which rotate around a horizontal axis. The mill is partly filled with steel or porcelain balls or pebbles and the material to be dispersed. Baffle bars are usually added to the sides of the tank to help lift the balls for better dispersion. Steel balls are more efficient because of their greater density but cannot be used to produce white paints. Ball mills require little attention after they have been charged and are capable of producing good dispersions.

The sand mill consists of a cylinder containing coarse sand as a grinding medium. The pigment paste to be dispersed is fed into the mill, and rotating impeller disks driven by a vertical shaft impart a circulation pattern to the sand-paste mixture. The difference is velocity between the particles near the surface of the impellers and the rest of the material develops a high shear action to disperse the pigments. A coarse screen allows the pigment slurry to pass through the mill while retaining the sand in the mill. Pigment slurrys may be passed through these mills for continuous operation. Production rates of sand mills may be fairly good, and dispersion is quite good. These mills are often used for high-quality industrial finishes.

The high-speed disperser consists of a tank containing a circular impeller driven at high speed by a vertical shaft. Dispersion of the pigment liquid mixture is achieved by high shear action developed near the surface of the impeller. High-speed dispersers are used where very fine dispersion is not required or whenever the pigments will disperse easily in the liquid. The production rate is very high, and this type of equipment is used to manufacture most architectural paints.

After the conjugated polymer and the optional pigments are dispersed and stabilized in the liquid or concentrate, said liquid or concentrate is usually transferred to a thin-down tank, equipped with slower agitation, where the coating is adjusted to the desired viscosity and shaded. Materials may be added to the paint in the thin-down tank which are not required in the grinding operation and may be added with slow agitation. The binder of a solvent-thinned paint is usually added during the grinding operation; the binder of a latex paint is usually added in the thin-down tank. Thin-down tanks are usually on a floor below the grinding equipment to take advantage of gravity flow, and the finished paint is usually dropped to a floor below the thin-down tanks for straining and filling.

The coating compositions of this invention are useful for such purposes for which conventional paints are used. For example, these paints are useful as top coats, fillers, primers, surfaces, and sealers. The method of drying the coating is not critical, and any conventional process may be used. For example, the coatings of the present invention may be air dried or dried at an elevated temperature. The preferred method of drying is air drying.

The following examples are provided to illustrate the present invention, but it will be understood that they are intended to be illustrative only and not limitative of the invention.

EXAMPLES

I. Preparation of Coating Composition

The paint formulation for use in the Examples below is based upon a suggested formula 2772GRY1, available from McWhorter for Duramac 2772 which is a high solids low VOC alkyd enamel.

Duramac 2772 Binder (24 gallons or 195.3 pounds) was placed under moderate agitation by a Cowles Disperser and the following components were then added to it:

| | |
|---|---|
| Yelkin TS (Wetting Agent) | 0.29 gallon |
| | (2.5 pounds) |
| 10% Calcium Drier | 0.24 gallon |
| | (2 pounds) |
| R-902 Titanium Dioxide | 5.86 gallons |
| | (200 pounds) |
| Atomite Calcium Carb (Extender Pigment) | 6.15 gallons |
| | (138.7 pounds) |

The shear rate was then increased to properly disperse the pigment. Shearing was continued until a Hegman grind of approximately 5.5 was achieved. A temperature of 60° C. (140° F.) was achieved and maintained for 10 minutes. The mixing speed was then reduced and the following components were then added:

| | |
|---|---|
| Duramac 2772 (Binder) | 33.98 gallons |
| | (276.6 pounds) |
| Odorless Mineral Spirits (Solvent) | 28 gallons |
| | (176.7 pounds) |
| 9% Manganese HS | 0.13 gallon |
| | (1.1 pounds) |
| 12% Cobalt Drier | 0.062 gallon |
| | (0.55 pound) |
| 16% Zinc Drier | 0.30 gallon |
| | (2.6 pounds) |
| 18% Nuxtra Ltd. Drier | 0.60 gallon |
| | (5.5 pounds) |
| Skino #2 (Anti-Skin Agent) | 0.26 gallon |
| | (2.0 pounds) | and blended until uniform (about 15 minutes).

The resulting paint formulation had a weight per gallon of about 10.41, as measured according to ASTM D-1475.

II. Dispersion or Gel Preparation

To add the rheological modifiers of the present invention to the paint formulation prepared in Section I above, a dispersion of the oxidized ethylene-carbon monoxide copolymer was prepared.

The dispersions were made at 20% solids. 600 grams of xylene (the liquid medium) were weighed into a 1000 ml, pyrex glass beaker. Then 150 grams of an oxidized ethylene-carbon monoxide copolymer, available from AlliedSignal, Inc., Morristown, N.J., United States of America were weighed into the liquid medium. Before oxidation, the ethylene-carbon monoxide copolymers had 3 weight percent carbon monoxide and 97 weight percent ethylene based on the total weight of the ethylene-carbon monoxide copolymer. The oxidized ethylene-carbon monoxide copolymer used had the following properties:

| | |
|---|---|
| Acid Number (mg KOH/g) | 16–18 |
| Brookfield Viscosity at 140° C. (centipoises) | 150–300 |
| Molecular Weight | 2,500–4,500 |
| Hardness (ASTM D-5) (dmm) | 4–8 |
| Mettler Drop Point (ASTM D-3104) (°C.) | 98–104 |

For Example 1, the oxidized ethylene-carbon monoxide copolymer was 24% solids in xylene. For Example 2, the oxidized ethylene-carbon monoxide copolymer was 20% solids in mineral spirits. The mixture was placed on a hot plate under moderate agitation produced by a 211 prop blade and a 1/18 HP Bodine motor (500 RPM MAX).

As the temperature was increased, the oxidized ethylene-carbon monoxide copolymer melted into the liquid medium, producing a clear solution at 105° C. The solution was then allowed to cool until the cloud point was reached, approximately 63° C. The cloud point is the temperature where the oxidized ethylene-carbon monoxide copolymer precipitates out of solution, and may be determined by the onset of opacity of the blend.

The mixture was then placed back on the hot plate and reheated until it clarified again. The mixture was again allowed to cool; but, beginning at 5° C. above the cloud point, until 10° C. below the cloud point, the mixture was rapidly cooled (shock cooling). The shock cooling was accomplished by immersing the beaker containing the mixture in an ice bath with continued agitation. During the rapid cooling step, the sides of the beaker were continually scraped with a spatula to prevent the formation of hard, cold gel on the beaker sides. If allowed to remain, this firm gel would drastically slow cooling.

The shock cooling process produced an opaque gel dispersion of fine particles. Once the lower end of the cloud point range was reached, the ice bath was removed, and agitation and scraping continued to room temperature.

Overnight, an increase in the viscosity of the gel was observed, but the gain in viscosity is easily re-broken down with shear.

III. Rheological Additive Addition

To test the effectiveness of the rheology modifier prepared in Section II above, it was then added to the paint formulation. A pint can with the weighed grind paste prepared in Section I above was placed under moderate shear on the Cowles disperser. The oxidized ethylene-carbon monoxide copolymer was then added at a 0.5% by weight loading based on total formula weight of the coating composition; since the rheological modifier was prepared in a 20% solids dispersion form, 2.5% by weight on total formula weight of dispersion is added.

The grind paste was brought back up to grinding speed and the temperature was monitored until about 140° F. (60° C.) was attained, and the speed was maintained another 10 minutes for total incorporation. The speed was then lowered to a moderate level and the correct amount of letdown was added under agitation. Blending was continued until the composition was uniform, with periodic scraping of the vessel sides. When fully homogenous, the agitation was slowed, and the entrapped air was released from the blend.

The following day, the composition was adjusted for weight per gallon by adding liquid medium which was a combination of xylene and odorless mineral spirits. The resulting composition had a corrected WPG of 10.41 pounds/gallon, as measured by ASTM D-1475.

IV. Testing (1) High Shear Viscosity—ASTM D-4287: The high shear viscosity of a paint composition is tested on an ICI cone and plate viscometer, and provides an indication of a formula's brushability properties. A drop of the paint was placed between the two metal plates of the viscometer, and the ability of the composition to be moved under high shear rates is measured. A lower viscosity reading is desirable for ease of application.

(2) Low Shear Viscosity—ASTM D-2196 METHOD A: Using a Brookfield RVF model synchrolectric viscometer, low shear viscosities were evaluated. This viscosity indicated the stability of the paint at low shear rates (on the shelf at rest and post application viscosity). It indicates how homogeneous the paint will remain on the shelf, and provides a measure of the paint's inherent body. A higher viscosity reading is desirable for long shelf life.

(3) Sag—ASTM D-4400 METHOD A: Tests were performed on the paint compositions of the present invention using a Leneta 3-12 mil anti-sag bar and Leneta 7B Sag & Levelling drawdown cards. The card was positioned flat on a vacuum plate and placed under vacuum. The U-shaped drawdown blade was placed at the top of the card, and the coating to be tested was placed between the arms of the blade. The blade was then dragged along toward the bottom of the card with sustained even pressure, to apply lines of paint having a thickness varying from 3 to 12 mils in increments of 1 mil. The card was then removed from the vacuum plate and suspended vertically with the 3 mil paint thickness line toward the top. The lines of paint were examined to determine the maximum thickness the paint could be applied without running or dripping (sagging).

(4) Flow—ASTM D-2801: Flow is the antithesis of sag, and indicates how well a paint on a vertical surface will flow to a level, glass-like finish. A balance of sag and flow is desired in many applications. The flow test results herein were obtained using a New York Paint and Coatings Society (NYPC) 0-10 LEVELING TEST blade and Leneta 7B Sag and Levelling drawdown cards. The test blade contains sets of two adjacent notches in varying depths. The paint was applied to drawdown card with even pressure, and the amount of paint required for the two lines to flow together was evaluated. After the paint is dry, a rating is recorded of 0–10, 10 being the best.

(5) Anti-Settling—ASTM D-869 AND ASTM D-1849: As the paint is stored in its container, the denser components (pigments, etc.) will try to settle to the bottom. A good, rheological agent for anti-settling will impede or stop this process; at the very least, it should create a "soft" settle which can easily be re-stirred. Hard compact sediments are very undesirable. Following a specified length of time on a shelf, the cans are reopened and checked for settling with a flat end spatula. The amount, type, and severity of the settling are recorded. Accelerated testing in an oven is also often performed at 49°–60° C. (120°–140° F.) for 30 days.

(6) Film Appearance: Using a 0.003"-6" long drawdown bar, a film of paint is applied on the vacuum plate to a Leneta 7B Sag and Levelling Card. After drying overnight, the surface appearance of the coating is checked for grit, non-uniformity, and other defects.

V. Results

The anti-sag and anti-settling properties of the coating composition prepared as outlined above (identified in Table 1 below as Example 1 and identified in Table 2 below as Example 2) were compared to those of a control coating composition containing no rheological additive (identified in Tables 1 and 2 below as Comparative A), and coating compositions containing standard rheological additives (identified in Table 1 below as Comparative B and identified in Table 2 below as Comparative C). For the results in Table 2, the additive was added in the grind base.

Comparative B contained Dislon® 6900-20X as the rheological additive. Dislon® 6900-20X is supplied by King Industries and reportedly is a polyamide wax which functions as both an anti-sagging and anti-settling agent. Dislon® 6900-20X is disadvantageous to use because problems exist in the incorporation of Dislon® 6900-20X into a coating composition. The product literature reports that incorporation must occur with a minimum of air entrapment because the presence of air may interfere with the dispersion of Dislon® 6900-20X and as a result, inhibit its performance. Also, overgrinding of Dislon® 6900-20X must not occur because its activity would be reduced. Additionally, Dislon® 6900-20X is used with toxic solvents such as ethylbenzene and methanol.

Comparative C contained Thixatrol® ST as the rheological additive. Thixatrol® ST is supplied by Rheox Inc. and reportedly is an organic derivative of castor oil which functions as an anti-sagging agent. Thixatrol® ST is disadvantageous to use because problems exist in the incorporation of Thixatrol® ST into a coating composition. The RHEOLOGY HANDBOOK reports that incorporation of Thixatrol® ST must occur with shear and heat over a period of time in order to rheologically develop the additive. The recommended processing temperature range for Thixatrol® ST is 63° C. to 74° C. for aliphatic solvent-based systems and 38° C. to 52° C. for aromatic systems with a dwell time of 15 to 30 minutes. The RHEOLOGY HANDBOOK reports that if the processing temperature is too low, incomplete rheological development occurs and if the processing temperature is too high, Thixatrol® ST becomes partially soluble which leads to loss of rheological structure and formation of soft gel particles upon cool down. In all the Comparatives, the additive was used at 0.5 weight percent based on the total formula weight.

Because different spindles were used for the rims listed in Tables 1 and 2, each high shear viscosity reading in Table 1 was multiplied by 4 to account for the 0–40 spindle used.

As the results in Table 1 indicate, the present composition has the best overall properties (low High Shear Viscosity, high Low Shear Viscosity, high Anti-Sag, high Flow, and excellent Film Appearance) regardless of whether the additive is added to the grind or added to the post grind with moderate shear, compared with the composition having no additive or the currently used additive. In addition to the desirable final properties provided by the present additive, use of the present additive eliminates the incorporation and toxic solvents problems involved with Dislon® 6900-20X and may be made as a pourable additive.

As the results in Table 2 indicate, the present composition has high Low Shear Viscosity and high Anti-Sag compared with the composition having no additive. Compared to a composition having a currently used additive, the present composition has overall better rheological properties. In addition to the desirable final properties provided by the present additive, use of the present additive eliminates the incorporation problems involved with Thixatrol® ST.

TABLE 1

| ADDITIVE | HIGH SHEAR VISCOSITY READING (POISE) × 4 FOR 0–40 SPINDLE | LOW SHEAR VISCOSITY (CENTEPOISE) | ANTI-SAG (Mil) | NYPC 0–10 FLOW | FILM APPEARANCE |
|---|---|---|---|---|---|
| *Additive was added to grind.* | | | | | |
| Comparative A | 2.7 × 4 = 10.8 | 1110 | 5 | 8 | Excellent |
| Comparative B | 3.4 × 4 = 13.6 | 1605 | 6 | 7.1 | Excellent |
| Example 1 | 3.2 × 4 = 12.8 | 2435 | 8 | 6 | Excellent |
| *Additive was added post pind with moderate shear.* | | | | | |
| Comparative B | 2.3 × 4 = 9.2 | 1530 | 7 | 6.5 | Excellent |
| Example 1 | 2.05 × 4 = 8.2 | 1950 | 7 | 6.5 | Excellent |
| *Additive was added to final coating composition.* | | | | | |
| Comparative B | 2.3 × 4 = 9.2 | 2665 | 9 | 4.5 | Many large chunks |
| Example 1 | 2.0 × 4 = 8.0 | 1230 | 5.5 | 8 | Loaded with small grit |

TABLE 2

| ADDITIVE | HIGH SHEAR VISCOSITY (POISE) | LOW SHEAR VISCOSITY (CENTEPOISE) | ANTI-SAG (Mil) | NYPC 0–10 FLOW | FILM APPEARANCE |
|---|---|---|---|---|---|
| Comparative A | 15.6 | 2740 | 7.5 | 7 | Excellent |
| Comparative C | 23.6 | 5640 | 10 | 5.5 | Excellent |
| Example 2 | 22.8 | 5680 | 10.5 | 5 | Excellent |

What is claimed is:

1. A coating composition comprising:
   (a) at least one polymeric binder selected from the group consisting of drying oils, alkyds, allylics, amino resins, epoxies, acrylics, phenolics, silicones, polyurethanes, coumarone indene resins, polyamides, polycarbonates, polymers derived from the polymerization of α,β-unsaturated monomers, vinyl polymers and copolymers, cellulosic polymers, and rubbers;
   (b) liquid medium; and
   (c) an anti-sag and anti-settling effective amount of an oxidized ethylene-carbon monoxide copolymer.

2. The coating composition of claim 1 wherein said oxidized ethylene-carbon monoxide copolymer has an acid number as determined by a standardized titration of KOH of between about 4 and about 100.

3. The coating composition of claim 1 wherein said oxidized ethylene-carbon monoxide copolymer has an acid number as determined by a standardized titration of KOH of between about 4 and about 60.

4. The coating composition of claim 1 wherein said oxidized ethylene-carbon monoxide copolymer has a number average molecular weight of from about 500 to about 10,000 as measured by a vapor pressure osmometer.

5. The coating composition of claim 1 wherein said oxidized ethylene-carbon monoxide copolymer has a number average molecular weight of from about 1,000 to about 8,000 as measured by a vapor pressure osmometer.

6. The coating composition of claim 1 wherein said oxidized ethylene-carbon monoxide copolymer has an acid number as determined by a standardized titration of KOH of between about 16 and about 18 and a number average molecular weight of from about 2,500 to about 4,500 as measured by a vapor pressure osmometer.

7. The coating composition of claim 1 wherein said oxidized ethylene-carbon monoxide copolymer is present in an amount of about 0.5 to about 2 percent by weight, based on the total weight of said coating composition.

8. The coating composition of claim 1 wherein said oxidized ethylene-carbon monoxide copolymer is present in an amount of about 0.5 to about 1 percent by weight, based on the total weight of said coating composition.

9. The coating composition of claim 1 wherein said composition has a low shear viscosity of about 1000 to about 10000 centipoises at a temperature of 20° C., as measured according to ASTM D-2196 Method A.

10. The coating composition of claim 1 wherein said composition has a high shear viscosity of about 5 to about 30 poises at a temperature of 20° C., as measured according to ASTM D-4287.

11. The coating composition of claim 1 wherein said composition has a sag resistance of at least about 7 mils, as measured according to ASTM D-4400 Method A, when dried at a temperature of 20° C.

12. The coating composition of claim 1 wherein said composition has a sag resistance which is greater than a composition without said oxidized ethylene-carbon monoxide copolymer, as measured according to ASTM D-4400 Method A.

13. The coating composition of claim 1 wherein said composition exhibits a settling rate at room temperature which is less than a composition without said oxidized ethylene-carbon monoxide copolymer, as measured according to ASTM D-869.

14. The coating composition of claim 1 wherein said composition further comprises a pigment.

15. The coating composition of claim 1 wherein said binder is an air dry alkyd coating.

16. The coating composition of claim 1 wherein said liquid medium is selected from the group consisting of mineral spirits and xylene.

17. A coating composition comprising:
   (a) pigment;
   (b) at least one polymeric binder;
   (c) liquid medium; and
   (d) an anti-sag and anti-settling effective amount of an oxidized ethylene-carbon monoxide copolymer.

18. The coating composition of claim 17 wherein said oxidized ethylene-carbon monoxide copolymer is present in an amount of at least about 0.5 percent by weight, based on the total weight of said coating composition.

19. A coating composition comprising:
   (a) at least one polymeric binder;
   (b) liquid medium;
   (c) a pigment; and
   (c) about 0.5 to about 2.0 percent by weight of an oxidized ethylene-carbon monoxide copolymer, wherein said composition has a sag resistance of at least about 7 mils, as measured according to ASTM D-4400 Method A, when dried at a temperature of about 20° C.

20. A coating composition, comprising:
   (a) at least one polymeric binder;
   (b) liquid medium;
   (c) pigment; and
   (c) about 0.5 to about 1.0 percent by weight of an oxidized ethylene-carbon monoxide copolymer, wherein said composition has a low shear viscosity of about 1000 to about 10000 centipoises, as measured according to ASTM D-2196 Method A; a high shear viscosity of about 5 to about 30 poises, as measured according to ASTM D-4287; and has a sag resistance of at least about 7 mils, as measured according to ASTM D-4400 Method A, when dried at a temperature of about 20° C.

21. A process for producing a paint composition, which comprises the following steps:
   (1) dispersing a rheological modifier in a liquid medium to form a gel, wherein said rheological modifier is oxidized ethylene-carbon monoxide copolymer; and
   (2) incorporating the gel into a paint composition.

22. The process of claim 21, wherein said gel is incorporated into the coating composition at a temperature of at least about 60° C.

* * * * *